United States Patent
Xue

(10) Patent No.: US 9,191,772 B2
(45) Date of Patent: Nov. 17, 2015

(54) BLUETOOTH CONNECTION METHOD AND SYSTEM

(75) Inventor: Tao Xue, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 195 days.

(21) Appl. No.: 13/985,848

(22) PCT Filed: Sep. 15, 2011

(86) PCT No.: PCT/CN2011/079659
§ 371 (c)(1),
(2), (4) Date: Aug. 15, 2013

(87) PCT Pub. No.: WO2012/116544
PCT Pub. Date: Sep. 7, 2012

(65) Prior Publication Data
US 2013/0324046 A1    Dec. 5, 2013

(30) Foreign Application Priority Data
Mar. 3, 2011   (CN) .......................... 2011 1 0051743

(51) Int. Cl.
*H04B 5/00*   (2006.01)
*G06F 21/31*   (2013.01)
(Continued)

(52) U.S. Cl.
CPC .............. *H04W 4/008* (2013.01); *H04L 9/3273* (2013.01); *H04L 69/18* (2013.01); *H04M 1/7253* (2013.01);
(Continued)

(58) Field of Classification Search
CPC ....... H04B 5/00; H04B 5/0062; H04L 9/3273
See application file for complete search history.

(56) References Cited

U.S. PATENT DOCUMENTS 6,842,460 B1 * 1/2005 Olkkonen et al. ............ 370/465
6,862,594 B1 * 3/2005 Saulpaugh et al.
(Continued)

FOREIGN PATENT DOCUMENTS

CN   1422008 A   6/2003
CN   1809842 A   7/2006
(Continued)

OTHER PUBLICATIONS

International Search Report in international application No. PCT/CN2011/079659, mailed on Dec. 22, 2011.
(Continued)

*Primary Examiner* — Andrew Wendell
*Assistant Examiner* — Cindy Trandai
(74) *Attorney, Agent, or Firm* — Oppedahl Patent Law Firm LLC

(57) ABSTRACT

The present disclosure provides a Bluetooth connection method, the method includes that: a client reads information stored in a Radio Frequency Identification (RFID) card and establishes a Bluetooth connection with a server according to the read information. The present disclosure also provides a Bluetooth connection system, wherein a Bluetooth address and an identification (ID) value of the RFID card are pre-stored in the RFID card; after reading the information stored in the RFID card, the client directly uses a Service Discovery Protocol (SDP) service search to carry out an interaction with the server, achieving automatic completion of a Bluetooth authentication while a Bluetooth service search is performed, thereby establishing a secure and reliable Bluetooth connection; The method significantly reduces the time for establishing a Bluetooth connection, and makes the application of the Bluetooth service more concise and rapid to realize, costing less, more efficient, and easier to popularize.

14 Claims, 3 Drawing Sheets

(51) Int. Cl.
  *H04W 4/00*    (2009.01)
  *H04M 1/725*   (2006.01)
  *H04W 8/00*    (2009.01)
  *H04L 29/06*   (2006.01)
  *H04L 9/32*    (2006.01)
  *H04W 76/02*   (2009.01)
  *H04W 84/18*   (2009.01)

(52) U.S. Cl.
  CPC .......... *H04W 8/005* (2013.01); *H04M 2250/04* (2013.01); *H04W 76/023* (2013.01); *H04W 84/18* (2013.01)

(56) References Cited

U.S. PATENT DOCUMENTS

| | | | |
|---|---|---|---|
| 7,251,729 B1 | 7/2007 | Park | |
| 7,266,695 B2* | 9/2007 | Nakayama | G06F 21/31 713/155 |
| 7,450,010 B1* | 11/2008 | Gravelle et al. | 340/572.1 |
| 2002/0099663 A1* | 7/2002 | Yoshino et al. | 705/65 |
| 2004/0176032 A1 | 9/2004 | Kotola et al. | |
| 2006/0061482 A1* | 3/2006 | Monney et al. | 340/825.52 |
| 2007/0116292 A1 | 5/2007 | Kurita et al. | |
| 2007/0202807 A1* | 8/2007 | Kim | 455/41.2 |
| 2007/0287424 A1 | 12/2007 | Park | |
| 2008/0045218 A1* | 2/2008 | Okochi et al. | 455/436 |
| 2008/0258864 A1* | 10/2008 | Hattori et al. | 340/5.8 |
| 2008/0280560 A1* | 11/2008 | Tuttle | 455/41.2 |
| 2009/0111378 A1* | 4/2009 | Sheynman et al. | 455/41.1 |
| 2009/0174525 A1 | 7/2009 | Yamauchi | |
| 2009/0227282 A1* | 9/2009 | Miyabayashi et al. | 455/552.1 |
| 2009/0319784 A1 | 12/2009 | Faith et al. | |
| 2010/0141395 A1* | 6/2010 | Nagai | 340/10.4 |
| 2010/0176928 A1* | 7/2010 | Isomura | 340/10.3 |
| 2010/0325713 A1 | 12/2010 | Kurita et al. | |
| 2011/0185409 A1* | 7/2011 | Chien et al. | 726/7 |

FOREIGN PATENT DOCUMENTS

| | | |
|---|---|---|
| CN | 1914858 A | 2/2007 |
| CN | 101277185 A | 10/2008 |
| CN | 101354740 A | 1/2009 |
| CN | 101567054 A | 10/2009 |
| CN | 101877602 A | 11/2010 |
| CN | 102111192 A | 6/2011 |

OTHER PUBLICATIONS

English Translation of the Written Opinion of the International Search Authority in international application No. PCT/CN2011/079659, mailed on Dec. 22, 2011.

Supplementary European Search Report in European application No. 11859774.9, mailed on Jan. 8, 2015. (6 pages—see entire document).

* cited by examiner

BLUETOOTH CONNECTION METHOD AND SYSTEM

TECHNICAL FIELD

The disclosure relates to Bluetooth technology of wireless communication, in particular to a Bluetooth connection method and system.

BACKGROUND

Bluetooth is a radio technology which supports short-range communication of a device, with a general communication distance of within 10 m, and Bluetooth can carry out wireless information exchange in between numerous devices including mobile telephone, PDA, wireless headphone, notebook computer, related peripherals, and the like. With the Bluetooth technology, communications in between mobile communication terminal devices can be simplified effectively, and communications between the devices and the Internet can also be simplified successfully, thereby making data transmission more prompt and efficient, which widens the path for wireless communications.

Bluetooth adopts a distributed network structure as well as a fast frequency hopping and short-packet technology, supports point-to-point and point-to-multipoint communications, operates at a global general Industrial Scientific Medical (ISM) frequency band of 2.4 GHz, has a data rate of 1 Mbps, and adopts a time division duplex transmission scheme to achieve a full-duplex transmission. Wherein, in a Bluetooth protocol stack, a Service Discovery Protocol (SDP), also referred to as a Bluetooth SDP, is used for providing specific meaning of an application program in a Bluetooth environment, and for discovering which service is available and deciding characteristics of the available service. SDP defines a method for a Bluetooth client to discover an available Bluetooth server service and characteristics, in which Bluetooth service attributes are as shown in Table 1:

TABLE 1

| attribute identifier | Type of attribute value |
| --- | --- |
| ServiceRecordHandle | <int> |
| ServiceClassIDList | <DES> |
| ServiceID | <UUID> |
| ProtocolDescriptorList | <DES>or<DEA> |
| BrowseGroupList | <DES> |

SDP adopts a client/server model and a request/response mechanism, as shown in FIG. 1, where a service record is saved on a sever, a client initiates a transaction via a request Protocol Data Unit (PDU), and the server returns a response PDU to respond the request.

Each SDP PDU includes a PDU header and PDU-specific parameter/parameters; the PDU header includes three domains: a PDU Identifier (PDU ID), a Transaction ID, and a Parameter Length, specifically as shown in FIG. 2. Wherein, the PDU ID is used to distinguish the type of a PDU, so as to determine the meaning of the PDU and parse a parameter thereof. A specification for the PDU ID and its corresponding value is as described in Table 2;

TABLE 2

| Value | Specification |
| --- | --- |
| 0x00 | Reserve |
| 0x01 | SDP_ErrorResponse |
| 0x02 | SDP_ServiceSearchRequest |
| 0x03 | SDP_ServiceSearchResponse |
| 0x04 | SDP_ServiceAttributeRequest |
| 0x05 | SDP_ServiceAttributeResponse |
| 0x06 | SDP_ServiceSearchAttributeRequest |
| 0x07 | SDP_ServiceSearchAttributeResponse |
| 0x07-0xFF | Reserve |

The Transaction ID is used to distinguish different request PDUs. When a response PDU is received, it is determined whether the response PDU is the response to a corresponding request PDU according to the Transaction ID of the response PDU, with the following specific determining principle: an SDP client selects an arbitrary value different from the Transaction ID of an existing request PDU as the Transaction ID of a request PDU, and the Transaction ID contained in a response PDU must be the same as the Transaction ID of its corresponding request PDU. The Parameter Length field denotes the overall length (in bytes) of parameters carried in this PDU.

Radio Frequency Identification (RFID) is a non-contact automatic identification technology, which automatically identifies a target object and acquires the related data through a radio frequency signal. The identification operation needs no manual intervention, and may operate under various harsh environments. The RFID technology may identify a fast-moving object, and may identify multiple tags at the same time, and it is fast and convenient to operate. The RFID is a simple wireless system, which generally consists of at least one interrogator (or reader) and multiple transponders (or tags). The system is usually used to control, detect, and track an object.

Information interaction between a communication terminal and a constantly varying environment may change and improve people's life style and quality of life, and the technologies of Bluetooth and RFID are two choices of great potential. Bluetooth may carry out information interaction with other devices within an effective range, thereby achieving the purpose of gathering information or issuing an order. However, there is a defect in a Bluetooth connection mode commonly used at present, i.e., it requires to go through a Bluetooth device inquiry and a service inquiry every time before establishing a Bluetooth connection, and it will cost more than ten seconds or even twenty or thirty seconds to complete the above mentioned inquiry; besides, the above mentioned inquiry also requires human participation. Therefore, the Bluetooth connection mode commonly used at present cannot well satisfy the requirement of concise and rapid connection in the communication terminal and the constantly varying environment.

SUMMARY

In view of the above, the main purpose of the present disclosure is to provide a Bluetooth connection method and system capable of implementing the rapid connection of a Bluetooth service.

For this purpose, the technical solution of the present disclosure is implemented as follows.

A Bluetooth connection method, including:

reading, by a client, information stored in a Radio Frequency Identification (RFID) card; and establishing, by the client, a Bluetooth connection with a server according to the read information.

Moreover, the method may further include: before reading, by a client, information stored in an RFID card, storing a Bluetooth address and an ID of the RFID card in the RFID card.

Wherein, the establishing, by the client, a Bluetooth connection with a server according to the read information may be:

carrying out, by the client, a Bluetooth authentication with the server by utilizing a challenge/answer mechanism of a Service Discovery Protocol (SDP) service search and utilizing the RFID according to the read information, and establishing, by the client, the Bluetooth connection when the Bluetooth authentication is successful.

Wherein, the carrying out, by the client, a Bluetooth authentication with the server by utilizing a challenge/answer mechanism of a Service Discovery Protocol (SDP) service search and utilizing the RFID may be:

generating, by the server, one random number R; and sending, by the server, the R and a Query to the client;

calculating, by the client, $H(ID)$, $H(ID\|R)$, $ID^*=S(ID)$, and $H(ID^*)=H(S(ID))$ via a one-way Hash function according to the received R and the read ID; and sending, by the client, the $H(ID)$ and the $H(ID\|R)$ to the server;

forwarding, by the server, the $H(ID)$ and the $H(ID\|R)$ received, as well as the R, to a background database;

calculating, by the database, $H(ID^*_i)$ according to the received data and a list stored in the database itself; and forwarding, by the database, the $H(ID^*_i)$ to the client through the server; and comparing, by the client, whether the received $H(ID^*_i)$ and the calculated $H(ID^*)$ are equal, if so, updating, by the client, the ID in the RFID card to $ID^*$, and determining that the client passes the Bluetooth authentication.

Wherein, the calculating, by the database, $H(ID^*_i)$ according to the received data and a list stored in the database itself may be:

determining, by the database, whether there exists an i satisfying $H(ID_i)=H(ID)$ in the list stored in the database itself; if so, finding, by the database, the $ID_i$ corresponding to $H(ID_i)$, and calculating, by the database, $H(ID_i\|R)$; and comparing, by the database, whether the $H(ID_i\|R)$ and the received $H(ID\|R)$ are equal; if so, further calculating, by the database, $ID^*_i=S(ID_i)$ and $H(ID^*_i)=H(S(ID_i))$, and sending, by the database, the $H(ID^*_i)$ to the server.

Moreover, the method may further include: after sending, by the database, the $H(ID^*_i)$ to the server, determining, by the database, whether an associating pointer in the list corresponding to the calculated $H(ID^*_i)$ is 0; if so, adding a new record; otherwise, modifying a record pointed to by the associating pointer.

Moreover, the method may further include: after comparing, by the database, whether the $H(ID_i\|R)$ and the received $H(ID\|R)$ are equal, when they are not equal, deciding the current client is an unauthorized terminal.

A Bluetooth connection system including a Radio Frequency Identification (RFID) card, a client, and a server, wherein the client is configured to read information stored in the RFID card and establish a Bluetooth connection with the server according to the read information.

Moreover, the RFID card may be configured to store a Bluetooth address and an ID of the RFID card.

Moreover, the client is specifically configured to carry out a Bluetooth authentication with the server by utilizing a challenge/answer mechanism of a Service Discovery Protocol (SDP) service search and utilizing the RFID according to the read information, and establish the Bluetooth connection when the Bluetooth authentication is successful.

Moreover, the system may further include a database;

accordingly, the server may be configured to generate one random number R, send the R and a Query to the client, and forward the R and $H(ID)$ and $H(ID\|R)$ sent by the client to the database;

the database may be configured to calculate $H(ID^*_i)$ according to the received data and a list stored in the database itself and forward the $H(ID^*_i)$ to the client through the server; and the client may be further configured to calculate $H(ID)$, $H(ID\|R)$, $ID^*=S(ID)$, and $H(ID^*)=H(S(ID))$ via a one-way Hash function according to the R and the read ID, send the $H(ID)$ and the $H(ID\|R)$ to the server, compare whether the received $H(ID^*_i)$ and the calculated $H(ID^*)$ are equal, and determine that the client passes the Bluetooth authentication if they are equal.

Wherein, the database is specifically configured to determine whether there exists an i satisfying $H(ID_i)=H(ID)$ in the list stored in the database itself, find the $ID_i$ corresponding to $H(ID_i)$ and calculate $H(ID_i\|R)$ if there does; compare whether the $H(ID_i\|R)$ and the received $H(ID\|R)$ are equal, and calculate $ID^*_i=S(ID_i)$ and $H(ID^*_i)=H(S(ID_i))$ when the $H(ID_i\|R)$ and the received $H(ID\|R)$ are equal, and send the $H(ID^*_i)$ to the server.

Moreover, the database may be further configured to determine whether an associating pointer in the list corresponding to the calculated $H(ID^*_i)$ is 0, to add a new record when the associating pointer is 0, and to modify a record pointed to by the associating pointer when the associating pointer is not 0.

With the present disclosure, a Bluetooth address and an ID of the RFID card are stored in the RFID card; after reading the information stored in the RFID card, the client directly uses an SDP service search to carry out an interaction with the server, achieving automatic completion of a Bluetooth authentication while a Bluetooth service search is performed, thereby establishing a secure and reliable Bluetooth connection; The method significantly reduces the time for establishing a Bluetooth connection, and makes the application of the Bluetooth service more concise and rapid to realize, costing less, more efficient, and easier to popularize; The method may also be extensively applied to industrial control, business management, home living, and the like, and it is especially applicable in a Bluetooth application which requires security authentication.

DETAILED DESCRIPTION

The basic idea of the present disclosure is that: a client reads information stored in an RFID card, and establishes a Bluetooth connection with a server according to the read information.

To make the purpose, technical solution, and advantage of the present disclosure more clear, the present disclosure is further elaborated below with reference to embodiments and accompanying figures.

Figure 1:
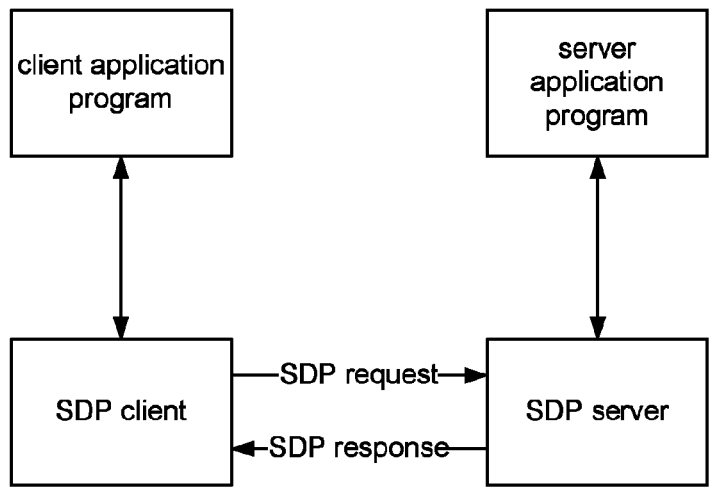
FIG. 1 is a schematic diagram of the structure of an SDP client/server model.
Figure 2:
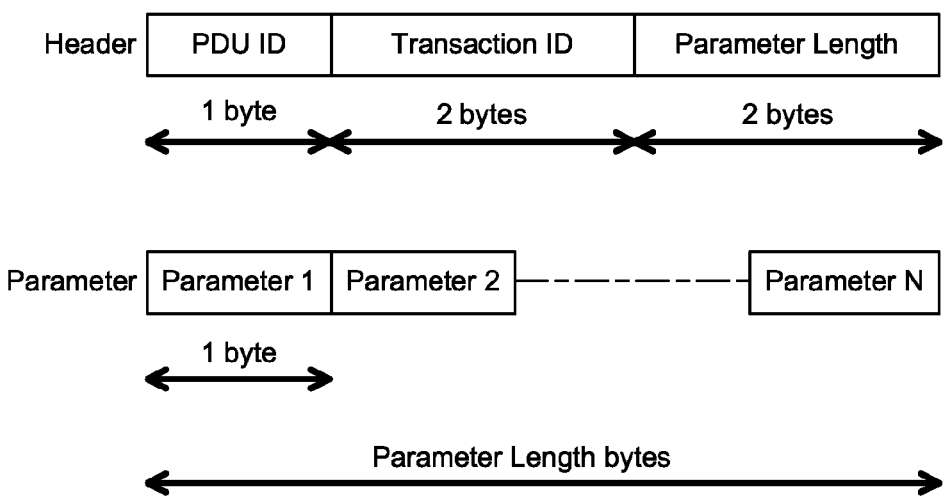
FIG. 2 is a schematic diagram of the format of a PDU.
Figure 3:
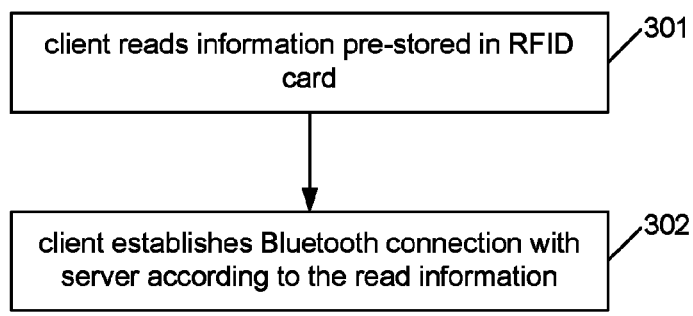
FIG. 3 is a flowchart of a Bluetooth connection method provided by the present disclosure.

FIG. 3 shows a flow of a Bluetooth connection method of the present disclosure; as shown in FIG. 3, the method includes the following steps:

Step 301, a client reads information pre-stored in an RFID card;

In this step, RFID card records seven-byte data, of which six-byte data are for a Bluetooth address, and one-byte data are for an initialized ID of the RFID card; it should be noted that the initialized ID here is not the unique ID configured for the RFID card at the factory, but is one pre-stored random number for Bluetooth authentication;

Moreover, it should be understood that the RFID card may be located inside the client, or may exist independently with respect to the client.

Step 302, the client establishes a Bluetooth connection with a server according to the read information;

In this step, the client carries out a Bluetooth authentication with the server by utilizing a challenge/answer mechanism of an SDP service search and utilizing the RFID, and establishes, the Bluetooth connection if the client passes the authentication.

Figure 4:
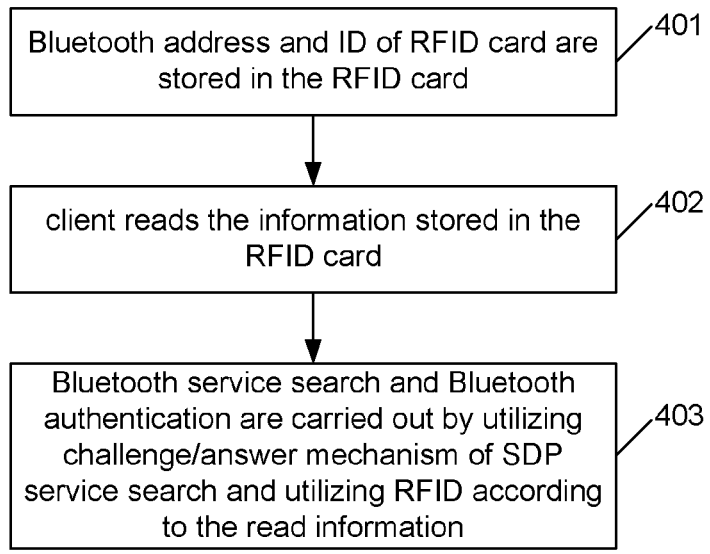
FIG. 4 is a flowchart of a specific embodiment of the Bluetooth connection method provided by the present disclosure.

FIG. 4 shows a flow of a specific embodiment of the Bluetooth connection method provided by the present disclosure; as shown in FIG. 4, the embodiment includes the following steps:

Step 401, information of the Bluetooth address and the ID of the RFID card is stored in the RFID card;

Step 402, the client reads the information stored in the RFID card, and acquires the Bluetooth address;

In this step, the client acquires one 48-bit Bluetooth address which defines one communication terminal and may uniquely identify one Bluetooth device.

Figure 5:
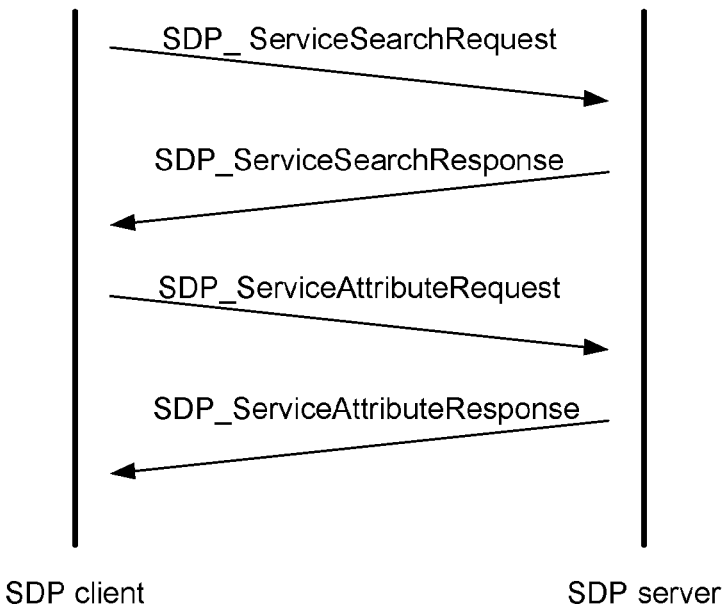
FIG. 5 is a schematic diagram of a PDU message interaction of an SDP service search.

Step 403, the client simultaneously carries out a Bluetooth service search and the Bluetooth authentication by utilizing the challenge/answer mechanism of the SDP service search and utilizing the RFID according to the read information, and establishes the Bluetooth connection if the client passes the authentication;

Specifically, with reference to a process of the SDP service search shown in FIG. 5, by carrying out PDU message interaction with the server, the client sends the information required by the Bluetooth authentication, completes the Bluetooth authentication, and establishes the Bluetooth connection.

It should be understood that SDP is one application layer protocol, while a Logical Link Control and Adaptation Protocol (L2CAP) is also required to ensure a function of the client and the server at an transport layer.

Figure 6:
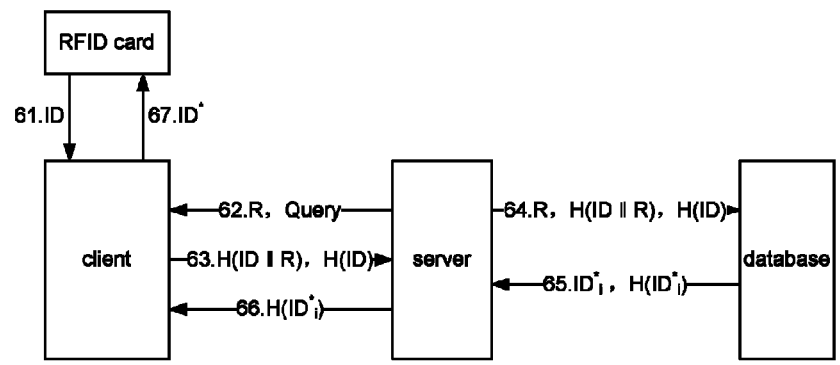
FIG. 6 is a schematic diagram of a process of Bluetooth authentication provided by the present disclosure.

Hereinafter, the Bluetooth authentication part in the Bluetooth connection method provided by the present disclosure is further elaborated with reference to FIG. 5 and FIG. 6, wherein description is made with the case that the RFID card exists independently with respect to the client, so as to understand the process of the Bluetooth authentication more clearly. It should be understood that the RFID card may also be located inside the client in a practical application.

Step 61, the client reads the ID stored in the RFID card;

Generally, the client reads the ID stored in the RFID card through an RFID card reader configured for the client itself;

Step 62, after receiving an SDP_ServiceSearchRequest sent by the client, the server generates one random number R, adds the random number R and a Query to an SDP_ServiceSearchResponse, and returns the SDP_ServiceSearchResponse back to the client;

Wherein, the specific SDP_ServiceSearchRequest sent by the client and the SDP_ServiceSearchResponse sent by the server are as shown in FIG. 5.

Step 63, the client calculates H(ID), H(ID∥R), ID*=S(ID), and H(ID*)=H(S(ID)) according to a pre-stored one-way Hash function, adds the calculated H(ID) and H(ID∥R) to an SDP_ServiceAttributeRequest, and sends the SDP_ServiceAttributeRequest to the server;

Wherein, the one-way Hash function is H(x) function and S(x) function; the role of the S(x) function is to generate a new ID of the RFID card through the ID originally stored in the RFID card, i.e., ID*=S(ID); In an embodiment of the present disclosure, the rule of the S(x) may be open to the client and a database, but may be kept confidential to the server.

Step 64, the server forwards the received H(ID) and H(ID∥R) and the generated random number R to a background database;

Step 65, the database calculates $H(ID^*_i)$ according to the received data and a list stored in the database itself and sends the calculated $H(ID^*_i)$ to the server;

Specifically, the list pre-stored in the database is $(H(ID_i), ID_i, Pointer_i)$, wherein a primary key is H(ID), the ID is the ID of an electronic tag which is authorized to establish the Bluetooth connection with the server, H(ID) is a calculated value of one-way Hash function, and the Pointer is an associating pointer for a data record, and is used to maintain a data consistency.

Wherein the specific process that the database calculates $H(ID^*_i)$ is that: first, the database determines whether there is an i satisfying $H(ID_i)$=H(ID) in the list $(H(ID_i), ID_i, Pointer_i)$, if so, then the database finds the $ID_i$ corresponding to $H(ID_i)$ and calculates $H(ID_i∥R)$;

Next, the database compares the calculated $H(ID_i∥R)$ and the received H(ID∥R) to see whether they are equal; if so, the database further calculates $ID^*_i=S(ID_i)$ and $H(ID^*_i)=H(S(ID_i))$ and sends the $H(ID^*_i)$ to the server; wherein the ID*, may also be sent along with the $H(ID^*_i)$ to the server.

In addition, the database determines whether the Pointer, in the list $(H(ID_i), ID_i, Pointer_i)$ corresponding to the calculated $H(ID^*_i)$ is 0; if so, the database adds a new record j: $(H(ID^*_i), ID^*_i, j)$; Otherwise, the database finds the $Pointer_i^{th}$ record which is pointed to by the Pointer, and modifies the record as $(H(ID^*_i), ID^*_i, i)$.

Step 66, the server adds the received $H(ID^*_i)$ to an SDP_ServiceAttributeResponse and sends the SDP_ServiceAttributeResponse to the client;

Specifically, this step also includes that: the client compares whether the received $H(ID^*_i)$ and the calculated H(ID*) are equal; if they are equal, then the step 67 is executed to complete the Bluetooth service search and the Bluetooth authentication; If they are not equal, then the Bluetooth authentication fails and a Bluetooth service is terminated.

Step 67, the client updates the ID in the RFID card to ID*.

In this step, since the ID in the RFID card is constantly updated, the security of the Bluetooth connection is increased.

Figure 7:
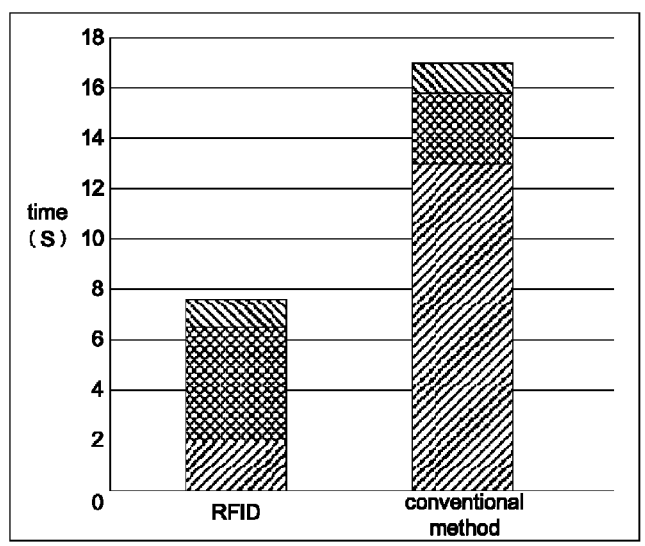
FIG. 7 is a comparison diagram of time spent with the Bluetooth connection method provided by the present disclosure and with a conventional Bluetooth connection method.

FIG. 7 shows a comparison of time spent with the above Bluetooth connection method and with a conventional Bluetooth connection method, wherein in the bar chart, the part filled with left slanted lines is a time spent for device inquiry, the part filled with grid lines is a time spent for service search, and the part filled with right slanted lines is a time spent for connection. As shown in FIG. 7, the bar corresponding to the RFID is the diagram of a time spent utilizing the Bluetooth connection method provided by the present disclosure. As after the Bluetooth address in the RFID card is read at the client (i.e., the time spent for device inquiry in FIG. 7), the step of searching the Bluetooth device in the conventional method is skipped directly; and while the Bluetooth service search is performed, the Bluetooth authentication is completed automatically through the SDP service search according to the read ID stored in the RFID card, such that the Bluetooth connection is established; while in the conventional method, searching the Bluetooth device is the most time consuming part in the process of establishing the Bluetooth connection; therefore, as shown in FIG. 7, it is achieved that the time spent for device inquiry in the bar corresponding to the RFID is less than that in the conventional method, and it can be seen that the Bluetooth connection method provided by the present disclosure reduces the time for the Bluetooth connection significantly.

The present disclosure also provides a Bluetooth connection system including an RFID card, a client, and a server, wherein the client is configured to read information stored in the RFID card, and to establish a Bluetooth connection with the server according to the read information;

Further, the RFID card is configured to store a Bluetooth address and an ID of the RFID CARD.

The client is configured to carry out a Bluetooth authentication with the server by utilizing a challenge/answer mechanism of an SDP service search and utilizing the RFID according to the read information, and establish the Bluetooth connection when the Bluetooth authentication is successful.

Further, the system also includes a database;

Accordingly, the server is also configured to generate one random number R, send the R and a Query to the client, and forward the R and H(ID) and H(ID||R) sent by the client to the database;

The database is configured to calculate $H(ID^*_i)$ according to the received data and a list stored in the database itself and forward the calculated $H(ID^*_i)$ to the client through the server; and The client is also configured to calculate H(ID), H(ID||R), $ID^*=S(ID)$, and $H(ID^*)=H(S(ID))$ via a one-way Hash function according to the R and the read ID, send the calculated H(ID) and H(ID||R) to the server, compare whether the received $H(ID^*_i)$ and the calculated $H(ID^*)$ are equal, and determine that the client passes the Bluetooth authentication if they are equal.

Further, the database is specifically configured to determine whether there exists an satisfying $H(ID_i)=H(ID)$ in the list $(H(ID_i), ID_i, Pointer_i)$ stored in the database itself, find the $ID_i$ corresponding to $H(ID_i)$ and calculate $H(ID_i||R)$ if there does exist an i; compare whether the $H(ID_i||R)$ and the received H(ID||R) are equal, and further calculate $ID^*_i=S(ID_i)$ and $H(ID^*_i)=H(S(ID_i))$ and send the $H(ID^*_i)$ to the server when the $H(ID_i||R)$ and the received H(ID||R) are equal.

Wherein, the database is also configured to determine whether $Pointer_i$ in the list $(H(ID_i), ID_i, Pointer_i)$ corresponding to the calculated $H(ID^*_i)$ is 0, add a new record j: $(H(ID^*_i), ID^*_i, j)$ when $Pointer_i$ is 0, and modify the $Pointer_i^{th}$ record to $(H(ID^*_i), ID^*_i, i)$ when $Pointer_i$ is not 0.

What described are merely preferred embodiments of the present disclosure, and are not intended to limit the scope of the present disclosure.

The invention claimed is:

1. A Bluetooth connection method, comprising:

reading, by a client, information stored in a Radio Frequency Identification (RFID) card; and establishing, by the client, a Bluetooth connection with a server according to the read information, wherein the establishing, by the client, the Bluetooth connection with the server according to the read information is:

carrying out, by the client, a Bluetooth authentication with the server by utilizing a challenge/answer mechanism of a Service Discovery Protocol (SDP) service search and utilizing the RFID according to the read information, and establishing, by the client, the Bluetooth connection when the Bluetooth authentication is successful, wherein the carrying out, by the client, a Bluetooth authentication with the server by utilizing a challenge/answer mechanism of a Service Discovery Protocol (SDP) service search and utilizing the RFID is:

generating, by the server, one random number R; and sending, by the server, the R and a Query to the client;

calculating, by the client, H(ID), H(ID||R), $ID^*=S(ID)$, and $H(ID^*)=H(S(ID))$ via a one-way Hash function according to the received R and the read ID; and sending, by the client, the H(ID) and the H(ID||R) to the server;

forwarding, by the server, the H(ID) and the H(ID||R) received, as well as the R, to a background database;

calculating, by the database, $H(ID^*_i)$ according to the received data and a list stored in the database itself; and forwarding, by the database, the $H(ID^*_i)$ to the client through the server; and comparing, by the client, whether the received $H(ID^*_i)$ and the calculated $H(ID^*)$ are equal, if so, updating, by the client, the ID in the RFID card to $ID^*$, and determining that the client passes the Bluetooth authentication.

2. The method according to claim 1, further comprising: before reading, by a client, information stored in an RFID card, storing a Bluetooth address and an ID of the RFID card in the RFID card.

3. The method according to claim 1, wherein the calculating, by the database, $H(ID^*_i)$ according to the received data and a list stored in the database itself is:

determining, by the database, whether there exists an i satisfying $H(ID_i)=H(ID)$ in the list stored in the database itself; if so, finding, by the database, the $ID_i$ corresponding to $H(ID_i)$, and calculating, by the database, $H(ID_i||R)$; and comparing, by the database, whether the $H(ID_i||R)$ and the received H(ID||R) are equal; if so, further calculating, by the database, $ID^*_i=S(ID_i)$ and $H(ID^*_i)=H(S(ID_i))$, and sending, by the database, the $H(ID^*_i)$ to the server.

4. The method according to claim 3, further comprising: after sending, by the database, the $H(ID^*_i)$ to the server, determining, by the database, whether an associating pointer in the list corresponding to the calculated $H(ID^*_i)$ is 0; if so, adding a new record; otherwise, modifying a record pointed to by the associating pointer.

5. The method according to claim 3, further comprising: after comparing, by the database, whether the $H(ID_i||R)$ and the received H(ID||R) are equal, when they are not equal, deciding the current client is an unauthorized terminal.

6. A Bluetooth connection system comprising a Radio Frequency Identification (RFID) card, a client, and a server, wherein the client is configured to read information stored in the RFID card and establish a Bluetooth connection with the server according to the read information, wherein the client is configured to carry out a Bluetooth authentication with the server by utilizing a challenge/answer mechanism of a Service Discovery Protocol (SDP) service search and utilizing the RFID according to the read information, and establish the Bluetooth connection when the Bluetooth authentication is successful;

wherein the system further comprises a database;

accordingly, the server is configured to generate one random number R, send the R and a Query to the client, and forward the R and H(ID) and H(ID∥R) sent by the client to the database;

the database is configured to calculate $H(ID^*_i)$ according to the received data and a list stored in the database itself and forward the $H(ID^*_i)$ to the client through the server; and the client is further configured to calculate H(ID), H(ID∥R), ID*=S(ID), and H(ID*)=H(S(ID)) via a one-way Hash function according to the R and the read $ID_i$, send the H(ID) and the H(ID∥R) to the server, compare whether the received $H(ID^*_i)$ and the calculated H(ID*) are equal, and determine that the client passes the Bluetooth authentication if they are equal.

7. The system according to claim 6, wherein the RFID card is configured to store a Bluetooth address and an ID of the RFID card.

8. The system according to claim 6, wherein the database is configured to: determine whether there exists an i satisfying $H(ID_i)$=H(ID) in the list stored in the database itself, find the $ID_i$ corresponding to $H(ID_i)$ and calculate $H(ID_i∥R)$ if there does; compare whether the $H(ID_i∥R)$ and the received H(ID∥R) are equal, and calculate $ID^*_i=S(ID_i)$ and $H(ID^*_i)=H(S(ID_i))$ when the $H(ID_i∥R)$ and the received H(ID∥R) are equal, and send the $H(ID^*_i)$ to the server.

9. The system according to claim 8, wherein the database is further configured to determine whether an associating pointer in the list corresponding to the calculated $H(ID^*_i)$ is 0, to add a new record when the associating pointer is 0, and to modify a record pointed to by the associating pointer when the associating pointer is not 0.

10. The system according to claim 8, wherein the calculating, by the database, $H(ID^*_i)$ according to the received data and a list stored in the database itself is:

determining, by the database, whether there exists an i satisfying $H(ID_i)$=H(ID) in the list stored in the database itself; if so, finding, by the database, the $ID_i$ corresponding to $H(ID_i)$, and calculating, by the database, $H(ID_i∥R)$; and comparing, by the database, whether the $H(ID_i∥R)$ and the received H(ID∥R) are equal; if so, further calculating, by the database, $ID^*_i=S(ID_i)$ and $H(ID^*_i)=H(S(ID_i))$, and sending, by the database, the $H(ID^*_i)$ to the server.

11. The system according to claim 10, further comprising: after sending, by the database, the $H(ID^*_i)$ to the server, determining, by the database, whether an associating pointer in the list corresponding to the calculated $H(ID^*_i)$ is 0; if so, adding a new record; otherwise, modifying a record pointed to by the associating pointer.

12. The system according to claim 10, further comprising: after comparing, by the database, whether the $H(ID_i∥R)$ and the received H(ID∥R) are equal, when they are not equal, deciding the current client is an unauthorized terminal.

13. The system according to claim 7, wherein the database is configured to: determine whether there exists an i satisfying $H(ID_i)$=H(ID) in the list stored in the database itself, find the $ID_i$ corresponding to $H(ID_i)$ and calculate $H(ID_i∥R)$ if there does; compare whether the $H(ID_i∥R)$ and the received H(ID∥R) are equal, and calculate $ID^*_i=S(ID_i)$ and $H(ID^*_i)=H(S(ID_i))$ when the $H(ID_i∥R)$ and the received H(ID∥R) are equal, and send the $H(ID^*_i)$ to the server.

14. The system according to claim 13, wherein the database is further configured to determine whether an associating pointer in the list corresponding to the calculated $H(ID^*_i)$ is 0, to add a new record when the associating pointer is 0, and to modify a record pointed to by the associating pointer when the associating pointer is not 0.

* * * * *